(12) United States Patent
Dong

(10) Patent No.: US 9,172,583 B1
(45) Date of Patent: Oct. 27, 2015

(54) ACTIVELY PROVISIONING A MANAGED NODE

(75) Inventor: Xiaoming Dong, South Jordan, UT (US)

(73) Assignee: Crimson Corporation, Dover, DE (US)

( * ) Notice: Subject to any disclaimer, the term of this patent is extended or adjusted under 35 U.S.C. 154(b) by 269 days.

(21) Appl. No.: 13/302,171

(22) Filed: Nov. 22, 2011

(51) Int. Cl.
*G06F 15/173* (2006.01)
*H04L 29/08* (2006.01)
*H04L 29/06* (2006.01)

(52) U.S. Cl.
CPC .......... *H04L 29/08072* (2013.01); *H04L 29/06* (2013.01)

(58) Field of Classification Search
CPC .......................... G06F 15/16; H04L 29/08072
USPC ......................................................... 709/224
See application file for complete search history.

(56) References Cited

U.S. PATENT DOCUMENTS

| | | | |
|---|---|---|---|
| 6,496,862 B1* | 12/2002 | Akatsu et al. | 709/224 |
| 6,983,317 B1* | 1/2006 | Bishop et al. | 709/223 |
| 7,552,438 B1* | 6/2009 | Werme et al. | 718/104 |
| 7,769,859 B1* | 8/2010 | Gaonkar et al. | 709/225 |
| 7,802,083 B2* | 9/2010 | Gurumoorthy et al. | 713/1 |
| 7,984,129 B2* | 7/2011 | Vaught | 709/223 |
| 8,220,049 B2* | 7/2012 | Maynard | 726/22 |
| 8,387,131 B2* | 2/2013 | Beachem et al. | 726/15 |
| 8,504,679 B2* | 8/2013 | Spire et al. | 709/224 |
| 8,533,445 B2* | 9/2013 | Wang et al. | 713/2 |
| 2003/0097587 A1* | 5/2003 | Gulick | 713/200 |
| 2003/0188208 A1* | 10/2003 | Fung | 713/320 |
| 2004/0024856 A1* | 2/2004 | Gere | 709/223 |
| 2004/0193707 A1* | 9/2004 | Alam et al. | 709/223 |
| 2005/0071625 A1* | 3/2005 | Schwartz et al. | 713/100 |
| 2005/0108582 A1* | 5/2005 | Fung | 713/300 |
| 2006/0236125 A1* | 10/2006 | Sahita et al. | 713/193 |
| 2007/0005992 A1* | 1/2007 | Schluessler et al. | 713/193 |
| 2007/0266138 A1* | 11/2007 | Spire et al. | 709/223 |
| 2008/0005222 A1* | 1/2008 | Lambert et al. | 709/203 |
| 2008/0028058 A1* | 1/2008 | Shaw et al. | 709/223 |
| 2008/0301665 A1* | 12/2008 | Charlton et al. | 717/170 |
| 2009/0024724 A1* | 1/2009 | Hirai | 709/223 |
| 2009/0240796 A1* | 9/2009 | Yokoyama et al. | 709/223 |
| 2010/0058306 A1* | 3/2010 | Liles et al. | 717/168 |
| 2010/0250797 A1* | 9/2010 | Khosravi et al. | 710/48 |
| 2010/0306334 A1* | 12/2010 | Dehaan et al. | 709/208 |
| 2011/0145558 A1* | 6/2011 | Khosravi et al. | 713/2 |
| 2011/0153725 A1* | 6/2011 | Edwards et al. | 709/203 |
| 2011/0252153 A1* | 10/2011 | Vlodavsky | 709/229 |
| 2011/0289305 A1* | 11/2011 | Zimmer et al. | 713/1 |
| 2012/0023210 A1* | 1/2012 | Lai et al. | 709/223 |
| 2012/0084424 A1* | 4/2012 | Huang | 709/223 |
| 2012/0254387 A1* | 10/2012 | Chang | 709/223 |
| 2013/0007437 A1* | 1/2013 | Shroni et al. | 713/2 |

* cited by examiner

*Primary Examiner* — Guang Li
(74) *Attorney, Agent, or Firm* — Austin Rapp & Hardman

(57) ABSTRACT

A computing device configured for actively provisioning a managed node is described. The computing device includes a processor and executable instructions stored in memory that is in electronic communication with the processor. The computing device identifies a managed node on a network. The computing device also determines whether the managed node comprises management hardware. The computing device further enables the management hardware. To enable the management hardware, the computing device opens hardware-based secure communication between the computing device and the node, allows access to a remote management engine and provisions the management engine. The computer device additionally adds the managed node to a database.

18 Claims, 8 Drawing Sheets

ACTIVELY PROVISIONING A MANAGED NODE

TECHNICAL FIELD

The present disclosure relates generally to computers and computer-related technology. More specifically, the present disclosure relates to actively provisioning a managed node by a computing device.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Many computers may be connected to such networks. A computer network may include hundreds or even thousands of computers.

As the use of computers has increased, so has the need to manage and update computers, especially in a controlled environment. Continual management of computers is one current challenge. For example, as computers are added to enterprise networks, maintenance, monitoring and general life-cycle management become increasingly difficult.

DETAILED DESCRIPTION

Figure 1:
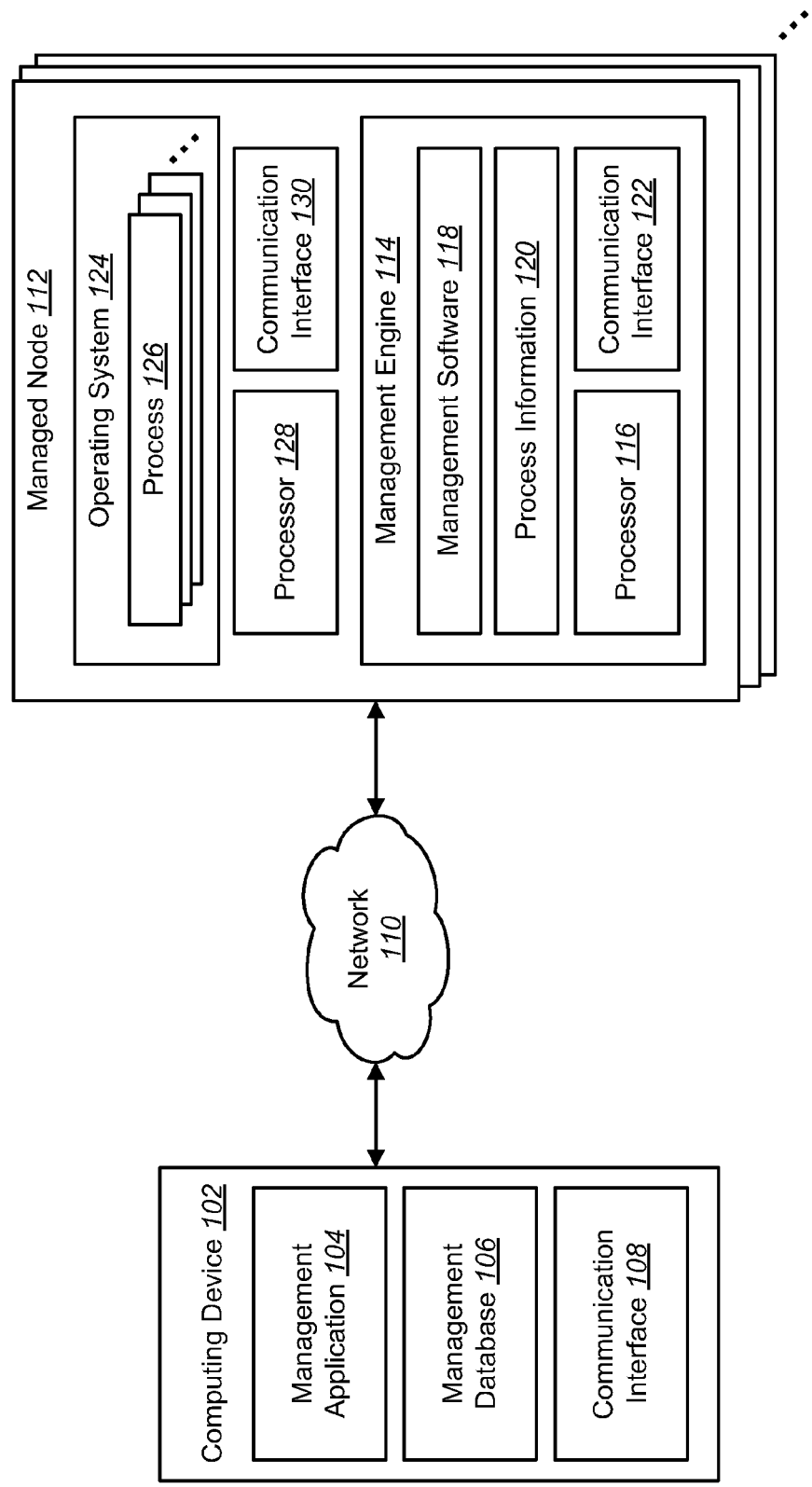
FIG. 1 is a block diagram illustrating one configuration of a system for actively provisioning a managed node.

A computing device configured for actively provisioning a managed node is described. The computing device includes a processor and executable instructions stored in memory that is in electronic communication with the processor. The computing device identifies a managed node on a network. The computing device also determines whether the managed node comprises management hardware. The computing device further enables the management hardware. Enabling includes opening hardware-based secure communication between the computing device and the node, allowing access to a management engine and provisioning the management engine. The computing device additionally adds the managed node to a database.

Identifying a managed node on a network may include detecting a new node being added to the network. Provisioning the management engine may include changing the management hardware to a specific state.

The computing device may configure the managed node. The computing device may be connected to the managed node by an out-of-band connection. The computing device may negotiate an authorized certificate.

The managed hardware on the managed node may include a processor, chipset and network adaptor. The managed hardware on the managed node may include Intel® vPro Technology. Further, no agent may be needed on the managed node.

A method for actively provisioning a managed node is also described herein. A managed node on a network is identified and, if the managed node includes management hardware, the management hardware is enabled. Enabling the management hardware may include opening hardware-based secure communication between a computing device and the node, allowing access to a management engine and provisioning the management engine. The managed node is added to a database.

A non-transitory tangible computer-readable medium for actively provisioning a managed node is also described. The computer-readable medium includes instructions for identifying a managed node on a network. The computer-readable medium also includes instructions for determining whether the managed node comprises management hardware. The computer-readable medium additionally includes instructions for enabling the management hardware. Enabling includes opening hardware-based secure communication between the computing device and the node, allowing access to a management engine and provisioning the management engine. The computer-readable medium further includes instructions for adding the managed node to a database.

The systems and methods disclosed herein may allow for actively provisioning a managed node by a computing device. In one example, actively provisioning a managed node may occur with proprietary technology such as with Intel® vPro enabled devices.

When a node or client is introduced into a managed network, it may be necessary for provisioning to occur before the managed device can be controlled by an administrative system. Provisioning allows a device to join a managed or controlled network. Provisioning refers to preparing and/or initiating a managed device to be managed by an administrative system, such as a computing device used by a network administrator. For example, provisioning may include configuring power management, configuring network access control and granting a managed device authorization and access to services and data on a controlled network.

In general, provisioning occurs on a managed or controlled network. A controlled network may be managed and controlled by a system administrator using an administrative system. For example, a management console (e.g., management application) on an administrative system may keep track of all the managed devices on the network and may be responsible for the provisioning process. As another example, the management console may allow or deny access to managed nodes for services offered by the network. However, if a managed device is not provisioned, it may not be able to fully access a network or participate in any of the offered services.

A managed device or managed node may include management hardware, such as a second processor, chipset and network adaptor interface, separate from hardware used by the operating system (OS) on the managed node. Management hardware may include hardware that is part of a management engine (ME). In other words, management hardware may be hardware that is controlled remotely by a management console, such that the management console has superior rights to the hardware over the local managed node's rights. Management hardware on a new managed node is disabled by default. Thus, unless the state of the management hardware is changed, it may be necessary for the management hardware on the managed node to be enabled before it can communicate with the management console on the administrative system. This configuration process is primarily done manually, node by node. When multiple managed nodes need to be set up and configured, this process can become very time consuming and laborious, especially in large enterprise networks.

Another problem that may impede active provisioning of a current managed node is that no automated provisioning process currently exists. Thus, remote configuration under current practices is not possible.

As part of the provisioning process, newly configured nodes attempt to send data packets to the administrative system. However, another problem is that these packets often fail to arrive due to the node being unable to successfully reach the administrative system. After a number of failures occur, the managed node stops attempting to reach the administrative system. Thus, provisioning fails and the managed node may be cut off from the network and all network services. When this happens, manual reconfiguration of an agent installed on the managed node may be required to reactivate the provisioning process on the managed node. An agent installed on the managed node adds unnecessary components and complexity. In any case, it may be necessary for the administrative system to passively wait for the managed node to establish a connection so that the provisioning process may be completed. Thus, as the use of managed nodes increases, these and other problems will also increase.

In one configuration, the computing device may actively provision a managed node rather than passively waiting for the managed node to request provisioning after manual configuration. For example, a computing device, such as an administrative system, may identify a new managed node added to a network and enable the management hardware automatically. The computing device may also assign a unique ID and configure network access control to the managed node so that the node cannot be controlled or managed by other devices. By having the computing device actively provision the newly added managed node, communication failures between the computing device and the managed node may be greatly reduced and/or eliminated.

In another configuration, a computing device may connect with the managed node out-of-band. In other words, the computing device may connect to the managed node regardless of the managed node's state so long as the managed node is connected to both a power source and a communication source. For example, the operating system on a managed node could be powered down and the computing device could still connect to and control the managed node. Additionally, the communication source may be a single connection or multiple connections. For example, a single communication port may be used to access and control a management engine on the managed node, as well as send regular network traffic to the managed node. Overall, the computing device may be in complete control of the provisioning process and may choose when to initiate the provisioning process rather than passively wait for provisioning to occur.

Once provisioning has occurred, the computing device may be able to control the managed node in a variety of ways. For example, the computing device may control the managed node via Serial Over LAN (SOL) or by IDE Redirection (IDER). For instance, by using SOL, the computing device can send and receive commands traditionally sent via a serial port of the managed node using internet protocol (IP). In another instance, the computing device may use IDER to configure the BIOS and/or mount a remote image. The computing device may also control the managed node via control the keyboard, via the video or visual display unit or via mouse (KMV). Further, the computing device may update the firmware of the managed node.

Additionally, the computing device may manage the power options of the managed node. For example, the computing device may specify for the managed node to be turned on or off, put into a standby state, etc. The computing device may also control the managed hardware and/or software on the managed node. For example, the computing device may enable or disable the management engine state control and/or the management software. In one instance, the management engine may be an Intel® Management Engine and the management software may be Intel® Active Management Technology (AMT).

In yet another configuration, the computing device may actively provision one or more managed nodes as part of a management suite. For example, the computing device may control managed Lenovo Secure Managed Client (SMC) nodes. In addition, the computing device may be configured to negotiate a valid certificate authorization with the managed node or with a third party. For instance, a valid certificate may be obtained from certificate authorities such as Verisign®, GoDaddy®, Comodo®, etc.

In still another configuration, once the computing device has actively provisioned a managed node, the computing device may add the managed node to a database. For example, the information such as power configuration, network access control, chipset, memory card of the managed node may be added to a database. In one instance, the database may be located on the computing device. In another instance, the database may be located on another device such as a setup and/or configuration server. Further, the database may be transferable to or from the computing device.

Various configurations of the systems and methods are now described with reference to the figures, where like reference numbers may indicate identical or functionally similar elements. The configurations of the present systems and methods, as generally described and illustrated in the figures herein, could be arranged and designed in a wide variety of different configurations. Thus, the following more detailed description of several configurations, as represented in the figures, is not intended to limit the scope of the systems and methods, as claimed, but is merely representative of the various configurations of the systems and methods.

FIG. 1 is a block diagram illustrating one configuration in which systems and methods for actively provisioning a managed node 112 by a computing device 102 may be implemented. Examples of the computing device 102 and/or the managed node 112 include desktop computers, laptop computers, servers, supercomputers, smartphones, tablet devices, game consoles, e-readers and/or other devices that include memory and a processor. The computing device 102 may be an administrative system. The computing device 102 may also include peer or child computing devices that share management responsibilities of the managed network(s).

The computing devices 102 may include a management application 104, a management database 106 and a communication interface 108. As used herein, an "application," "module" or "engine" may be implemented in hardware, software or a combination of both. For example, the management application 104 may be implemented in hardware, software or a combination of hardware and software. In one instance, an example of a management application 104 that may be used is the console application for the LANDesk Management Suite.

The management application 104 may be used to manage or control one or more managed nodes 112. This management may occur through the communication interface 108 via a network 110. For example, the network may be a local area network (LAN), wireless LAN (WLAN), municipal area network (MAN), wide area network (WAN), the Internet, etc.

The managed node 112 may include an operating system 124 and a management engine (ME) 114. In some instances, the ME 114 may be called a management system. The ME 114 may include both hardware and firmware components. Additionally, the ME may also include software. In general, the ME 114 interfaces with the computing device 102 and controls the management hardware on the managed node 112. For example, the ME 114 may control the power state of the managed node 112. The management engine 114 may include a processor 116, management software 118, process information 120 and a communication interface 122. The ME 114 may be used to control the managed node 112. The ME 114 may use Intel® Management Engine hardware and/or software to control a managed node 112. In one example, the computing device 102 may configure the ME 114 to enable management of the managed node 112 via SOL-IDER.

The management software 118 may be used to control functions of the managed node 112. The management software 118 may be used in connection with Intel® Active Management Technology (AMT). For example, the managed node 112 may have Intel® vPro Technology, which allows for remote management of a managed node 112 once provisioning has successfully been completed.

The operating system (OS) 124 of the managed node 112 may include processes 126. The OS 124 may also be in electronic communication with a second processor 128 and a communication interface 130. The OS 124 and the ME 144 may use separate processors, processor 128 and processor 116 respectively. In this way, the ME 114 can function independently of the OS 124. For example, if the OS 124 is in a standby state or off state, the ME 114 may still be able to control or activate the managed node 112 through the use of the processor 116 of the ME 114. In another example, the OS 124 may be running processes 126 on the processor 128 and the computing device 102 may use the processor 116 on the ME 114 to stop and/or override the running processes 126. However, the processor 116 on the ME 114 may also be used or shared by the OS 124. For example, a process 126 may run on both the processor 128 of the OS 124 and the processor 116 of the ME 114. In some cases, the processor 128 and/or the processor 116 may be a virtual processor.

The communication interface 130 may be the same communication interface 122 as the management engine 114 or it may be a separate hardware component. For example, both the communication interface 130 of the OS 124 and the communication interface 122 of the ME 114 may use the same physical port, but each has a separate TCP/IP (Transmission Control Protocol/Internet Protocol) network stack. In this way, the ME 114 can negotiate an IP address even when the OS 124 does not have an IP address.

Figure 2:
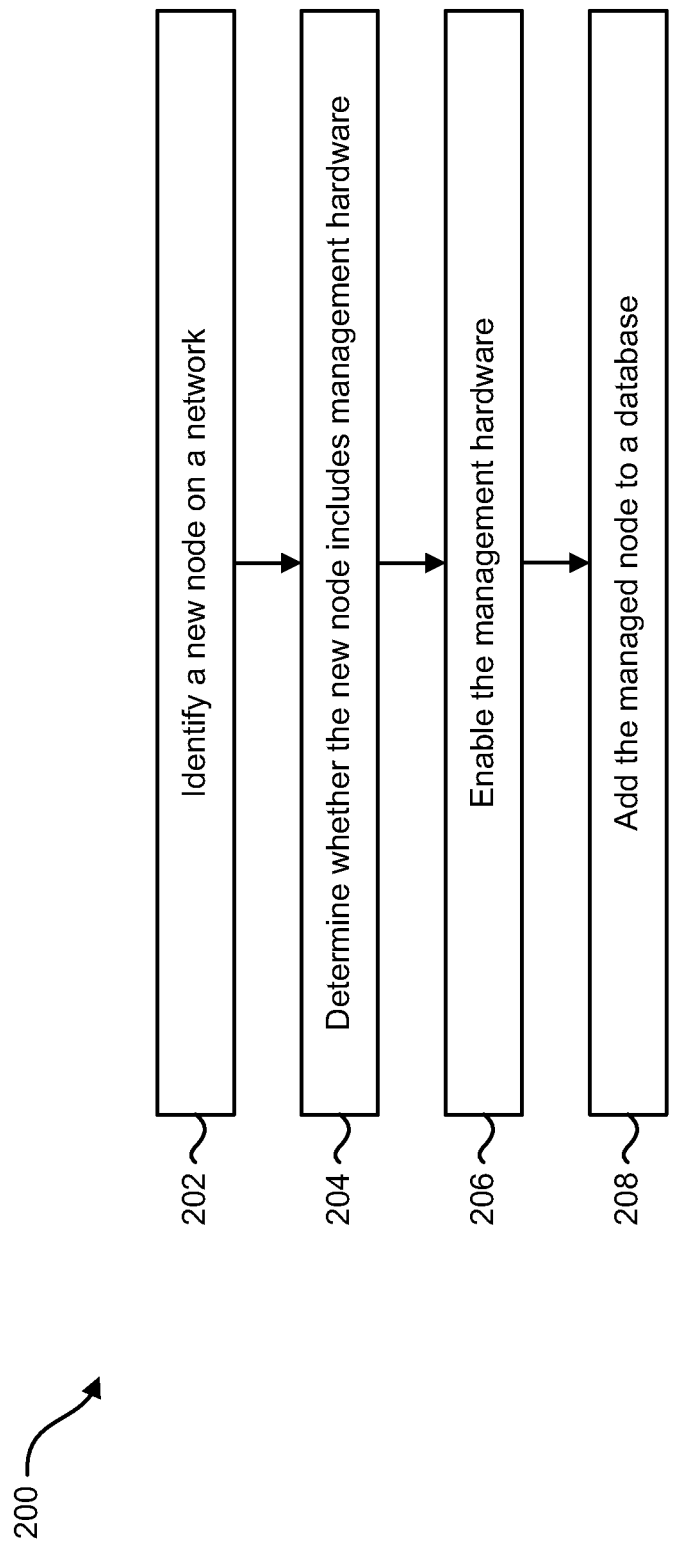
FIG. 2 is a flow diagram illustrating one configuration of a method for actively provisioning a managed node.

FIG. 2 is a flow diagram illustrating one configuration of a method 200 for actively provisioning a managed node 112 by a computing device 102. A computing device 102 may identify 202 a new node on a network 110. The computing device 102 may determine 204 whether the new node includes management hardware, such as the hardware within a management engine. In other words, the computing device 102 determines 204 whether the new node is a managed node 112 that includes a management engine 114 such that the computing device 102 may control the management hardware. In some cases, the control of the management hardware by the computing device 102 may be exclusive. The computing device 102 may determine 204 that the new node is a managed node 112 by the presence of management hardware located on the managed node 112. For example, the management hardware may include a processor, chipset and network adaptor separate from the processor, chip set and network adaptor used by the OS 124. In another example, the management hardware may be hardware associated with Intel® vPro technology.

The computing device 102 may enable 206 the management hardware. For example, the computing device 102 opens a secure communication channel with the management engine 114. Continuing the example, the computing device 102 then enables 206 the management hardware by actively provisioning the management hardware into a specific state. For instance, this may include changing or enabling the managed node's 112 power configuration, wired or wireless communication mode, network access control, etc. In this manner, no agent is needed on the managed node 112.

The computing device may add 208 the managed node 112 to a database 106. For example, the computing device 102 may add 208 system information of the managed node 112 to a database, such as chipset, memory card and configuration setup. In some instances, the configuration setup may include power configuration and network access control settings that are set during the provisioning process of a managed node 112.

In some configurations, the database 106 may be a secure database 106. The database 106 may have multiple entries from a combination of managed nodes 112.

Figure 3:
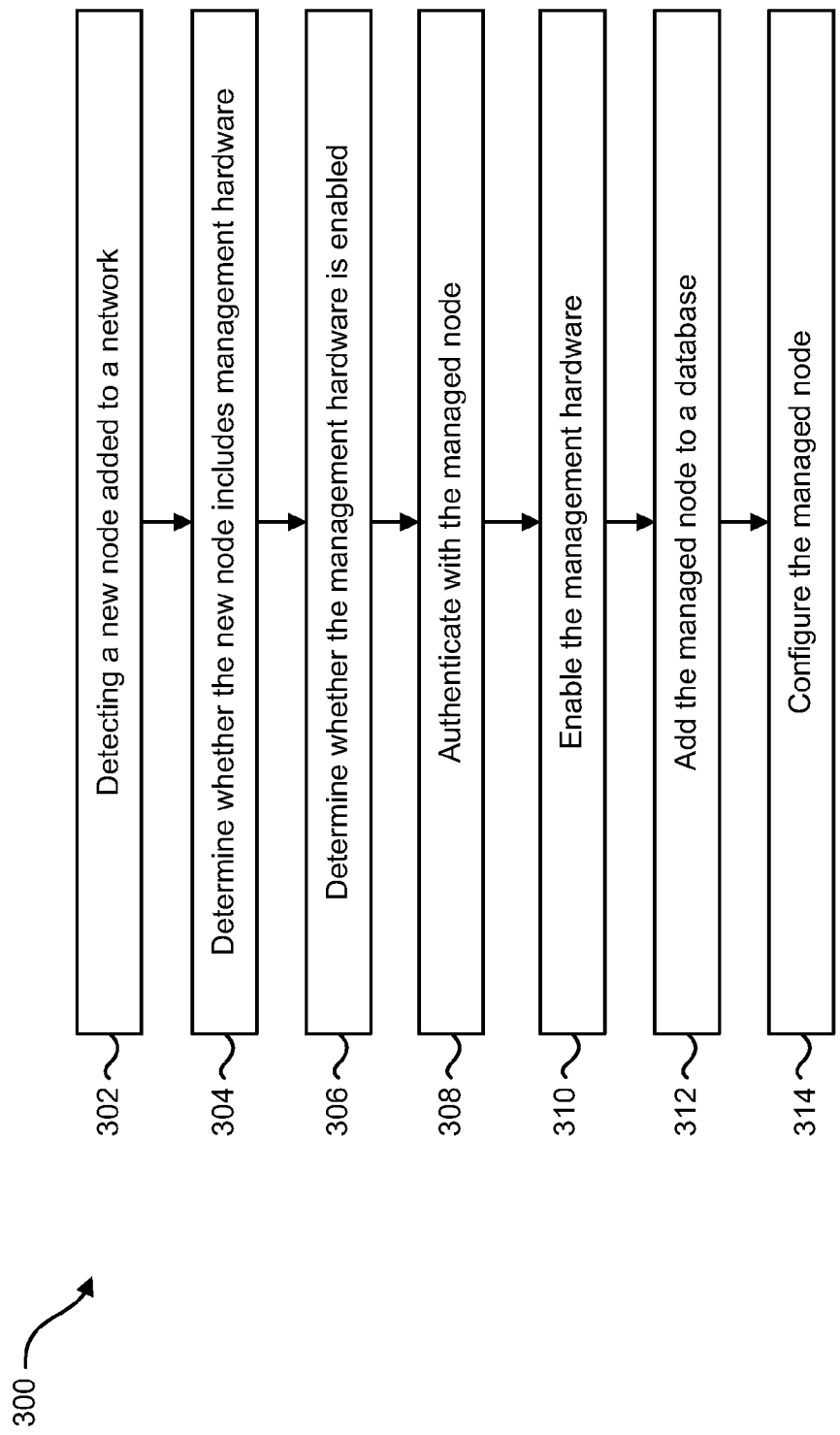
FIG. 3 is a flow diagram illustrating a more specific configuration of a method for actively provisioning a managed node.

FIG. 3 is a flow diagram illustrating a more specific method 300 of a configuration for actively provisioning a managed node 112 by a computing device 102. A computing device 102 may detect 302 a new node on a network 110. For example, the computing device 102 may detect that a new device is requesting a network address or may detect 302 a new node while scanning the network 110 for configuration changes.

The computing device 102 may determine 304 whether the new node includes management hardware. In other words, the computing device 102 may determine 304 whether the new node is a managed node 112 or not. If the computing device 102 determines 304 that management hardware is present on the new node, then the computing device 102 may determine 306 whether the management hardware is enabled. For example, if the computing device 102 detects that the management hardware is enabled and that the computing device 102 can already control the managed node, then no further action may need to occur. However, if the computing device determines 306 that the management hardware is not enabled, then it may need to enable 310 the management hardware.

The computing device may authenticate 308 with the managed node. This may occur before or after enabling 310 the management hardware. In one example, the computing device 102 may need to submit credentials such as a valid certificate to a new node before being able to determine 304 whether the new node includes management hardware. In another example, the computing device 102 may need to be authenticated 308 with the managed node 112 to complete the enabling 310 process.

The computing device may add 312 the managed node 112 to a database 106. The computing device 102 may also configure 314 the managed node 112. For example, the computing device 102 may configure the management engine 114 located on the managed node 112. Additionally, the computing device 102 may also perform a variety of management functions on the managed node 112. For example, the computing device 102 may perform a firmware update on the managed node 112.

Figure 4:
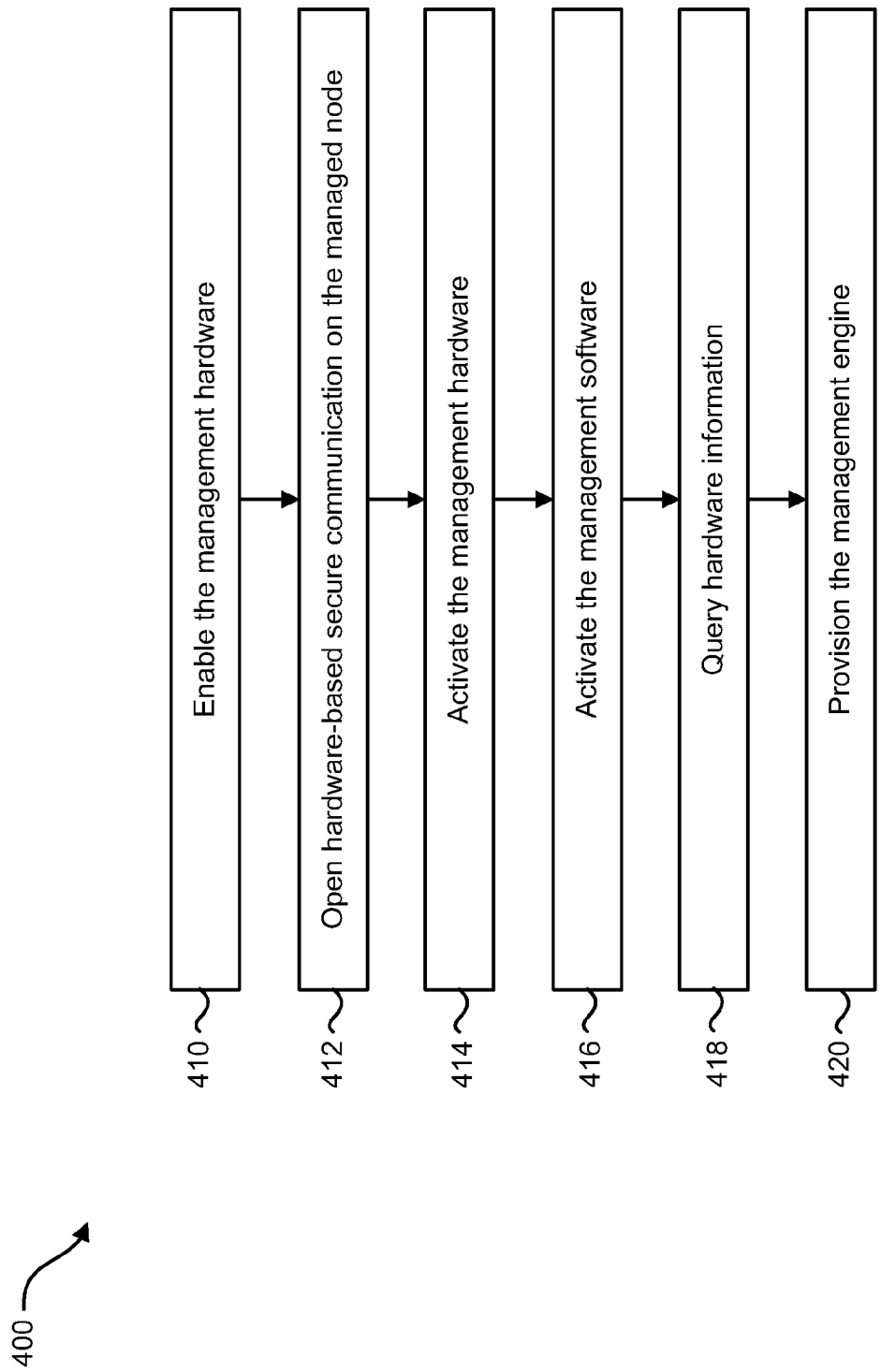
FIG. 4 is a flow diagram illustrating one configuration of a method for enabling management hardware on a managed node.

FIG. 4 is a flow diagram illustrating a more specific method 400 of a configuration for enabling management hardware on a managed node 112. The computing device 102 may enable 410 the management hardware on the managed node 112. In one configuration, the computing device 102 may open 412 a hardware-based secure communication between the computing device 102 and the managed node 112. Such hardware-based communication may be communication that occurs independently of any software running on the managed node 112. For example, even when the managed node 112 is powered off, the computing device 102 may be able to authenticate itself with the hardware of the managed node 112 by using a certificate, such as a certificate from a certificate authority (CA) like VeriSign®. This may enable the computing device to be able to establish a secure connection and/or communicate with management engine 114 located on the managed node 112.

The computing device 102 may activate 414 the management hardware on the managed node 112. For example, the processor 116, chipset and communication interface 122 on the ME 114 may be switched from an off state to an on state. Additionally, the computing device 102 may activate 416 the management software 118 on the managed node 112. For example, the management software 118 may provide a graphical interface to the computing device 102 and may allow the computing device 102 to monitor active processes 126 running on the OS 124 of the managed node 112. Once the management hardware and/or software are activated 414, 416 on the managed node 112, the computing device 102 may be able to gain access to the management engine 114.

The computing device 102 may query 418 hardware information on the managed node 112. For example, the hardware information might include a chipset and/or a memory card. The computing device 102 may also provision 420 the management engine 114 (e.g., management system) of the managed node 112. In some instances, provisioning may include power management and/or network access control. In one instance, once the managed node 112 is enabled and configured, only the computing device 102 may control the managed node 112. Thus, other computing devices are not able to control the managed node 112 unless the managed node 112 is manually reconfigured or if the computing device 102 relinquishes control of the managed node 112.

Figure 5:
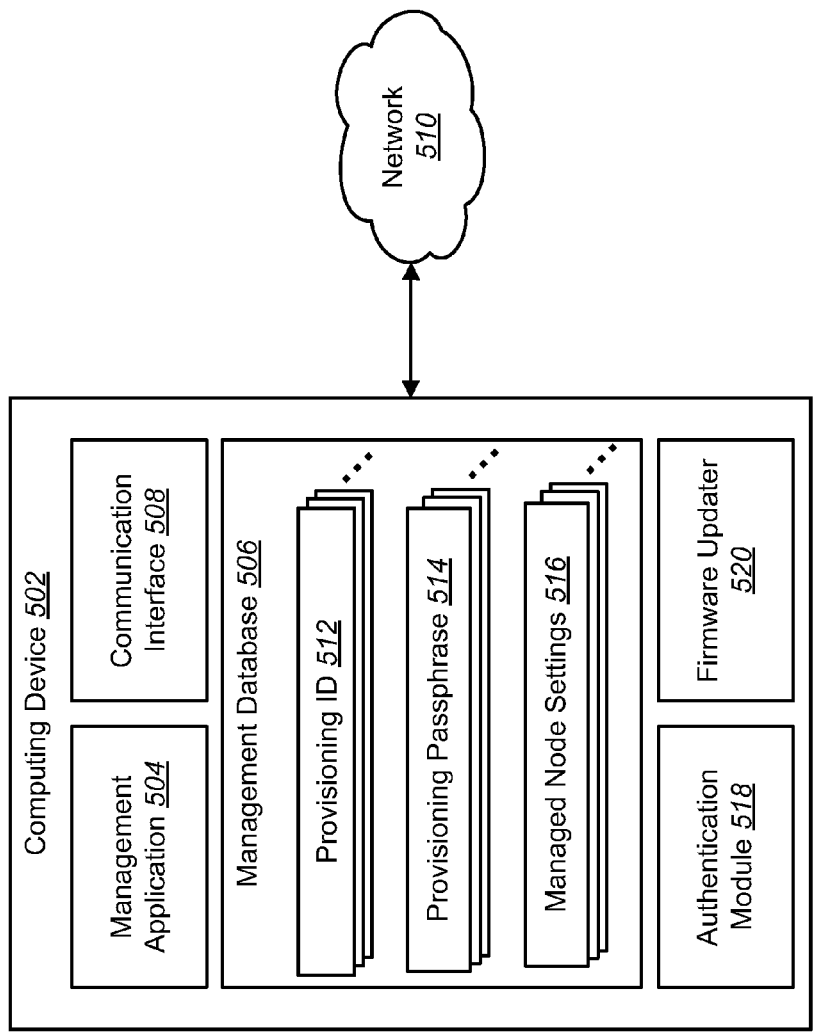
FIG. 5 is a block diagram illustrating one configuration of a computing device that may be utilized in connection with systems and methods for actively provisioning a managed node.

FIG. 5 is a block diagram illustrating a more specific configuration of a computing device 502 that may be utilized in connection with systems and methods for actively provisioning a managed node 112. The computing device 502 illustrated in FIG. 5 may be configured similarly to the computing device 102 illustrated in FIG. 1. The computing device 502 may include a management application 504, management database 506 and communication interface 508 similar to components 104, 106 and 108 described above in connection with FIG. 1. The computing device 502 may be connected to a network 510. The network 510 may also be similar to the network 110 described above in connection with FIG. 1.

In one configuration, the management database 506 may have one or more provisioning IDs (PID) 512 and/or provisioning passphrases (PPS) 514. The PID 512 may uniquely identify each managed node 112 by a unique identification name or number. The PPS 514 may be a passphrase generated by the computing device or may be one received by user input. Additionally, the computing device 502 may require additional validation in addition to the PPS 514 to gain access to a managed node 112.

The management database 506 may also include managed node settings 516. These settings may be from one or more managed nodes 112. Associated with each managed node setting 516 may be the node's 112 current configuration and settings. For example, the managed node setting 516 may specify the current hardware and/or software configurations. A variety of other information may also be stored in the management database 506. Additionally, the management database 506 may be located within the computing device 102 or external to the computing device 102. Further, each element within the management database 506 may be located in the same or on separate databases. For example, the PID 512 and PPS 514 may located in one management database 506 while the managed node settings 516 may be located in another management database 506

The computing device 102 may also have an authentication module 518. The authentication module 518 may be able to communicate with a certificate issuing authority. For example, the authentication module 518 may negotiate and/or automatically renew a valid certificate with Verisign®. The authentication module 518 may also be able to negotiate with a newly detected node 112. For example, the computing device 502 may employ the authentication module 518 to negotiate authorization to allow the computing device 502 to enable and configure the managed node 112. Similarly, the authentication module 518 may verify that a managed node 112 has valid credentials.

The computing device may also include a firmware updater 520. The firmware updater 520 may receive updates for various system configurations and may also push updates to managed nodes 112. For example, the firmware updater 520 may receive a security patch from a software vendor. The firmware updater 520 may check the managed node settings 516 in the management database 506 for applicable managed nodes 112 needing the received security patch. The firmware updater 520 may then push the security update to each applicable managed node 112. In this way, the computing device 502 may monitor and update the managed nodes 112 automatically.

Figure 6:
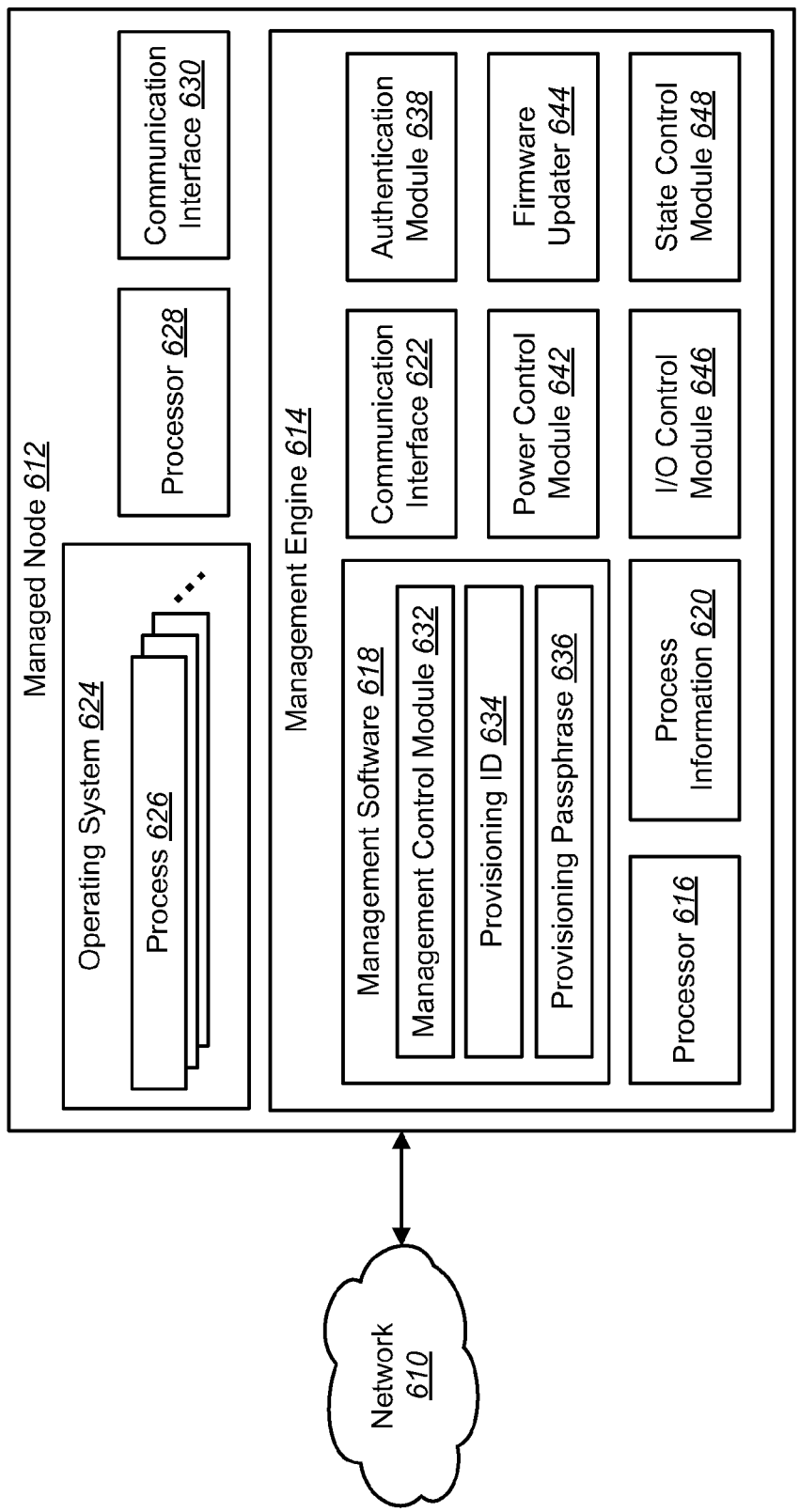
FIG. 6 is a block diagram illustrating one configuration of a managed node that may be utilized in connection with systems and methods for actively provisioning a managed node.

FIG. 6 is a block diagram illustrating a more specific configuration of a managed node 612 that may be utilized in connection with systems and methods for actively provisioning a managed node 612. The managed node 612 illustrated in FIG. 6 may be configured similarly to the managed node 112 illustrated in FIG. 1. The managed node 612 may include a management engine (ME) 614 with a processor 616, management software 618, process information 620 and a communication interface 622 and an operating system 624 with processes 626, a processor 628 and communication interface 630 similar to components 114, 116, 118, 120, 122 124, 126, 128 and 130 described above in connection with FIG. 1. The managed node 612 may be connected to a network 610. The network 610 may also be similar to the network 110 described above in connection with FIG. 1.

The management engine 614 may have an authentication module 638. The authentication module 638 may be used in connection with the authentication module 518 of the computing device 502 shown in FIG. 5. For example, the authentication module 638 on the managed node 612 may negotiate with the computing device 502 to verify that the computing device is 502 authorized to control the managed node 612. The authentication module 638 may use the network 610 to communicate with a third party (not shown) to complete the verification process. The authentication module 638 may also use a secure Pre-Shared Key (PSK) to communicate with the computing device 502.

The ME 614 may also include management software 618 that includes a management control module 632, a provisioning ID (PID) 634 and a provisioning passphrase (PPS) 636. The management control module 632 may control the various software functions on the ME 614. The PID 634 may be a unique number and/or phrase to identify the managed node 612. The PPS 636 may have a secure password or passphrase that may be required to gain control over the managed node 612. The PID 634 and PPS 636 may be located within the management software 618 or elsewhere in the management engine 614.

The communication interface 622, in addition to other features described with the communication interface 122 discussed in connection with FIG. 1, may be used to control a variety of communication methods on the managed node 612. For example, the communication interface 622 may be used by the computing device 502 to communicate with the managed node 612 via Serial Over LAN (SOL) or by IDE Redirection (IDER).

The ME 614 may also have a state control module 648. The state control module 648 may monitor the various states of the managed node 612. The state control module 648 may notify the computing device 502 on the current power, operating system (OS) 624 and operating state of the managed node 612. For example, the computing device 502 may query the state control module 648 as to the current power state of the managed node 612. As another example, the state control module 648 may notify the computing device 502 that the OS 624 on the managed node 612 has become deadlocked or has stopped responding.

The management engine (ME) 614 may also include a power control module 642. The power control module 642 may control the various power states of the managed node 612. The computing device 502 may send a command to the power control module 642 to change the current power state of the managed node 612. For instance, the computing device 502 may specify for the managed node 612 to be turned on or off, put into a sleep mode, etc.

The management engine 614 of the computing device 612 may have a firmware updater 644. The firmware updater 644 may be used in conjunction with the firmware updater 520 of the computing device 502 discussed in connection with FIG. 5. For example, the firmware updater 644 on the managed node 612 may communicate with the computing device 502 to facilitate a firmware update. Other firmware and software updates may also be controlled and performed by the firmware updater 644. For example, the computing device 502 may update the OS 624 on the managed node 612 using the firmware updater 644.

In some cases, ME 614 may employ multiple components together. For example, the computing device 502 may detect that a firmware update or software patch is necessary for the managed node 612. However, to prevent productivity interruptions, the update is scheduled to be performed at night when the managed node 612 is not in use. In this example, the computing device 502 may query the state control module 648 as to the current power state of the managed node 612. If the managed node 612 is switched off, the computing device 502 may command the power control module 642 to switch the managed node 612 to the on state. Then the computing device 502 may command the firmware updater 644 to install the update or patch. If required, the computing device 502 may command the power control module 642 to restart the managed node 612. Finally, the computing device 502 may command the power control module 642 to return the managed node 612 to its previous power state, for example, the off state.

The ME 614 may also have an I/O control module 646. The I/O control module 646 may allow the computing device 502 to control various inputs of the managed node 612. For example, the computing device 502 may use the I/O control module 646 to control the keyboard, video or visual display unit or mouse (KMV) on the managed node 612.

Figure 7:
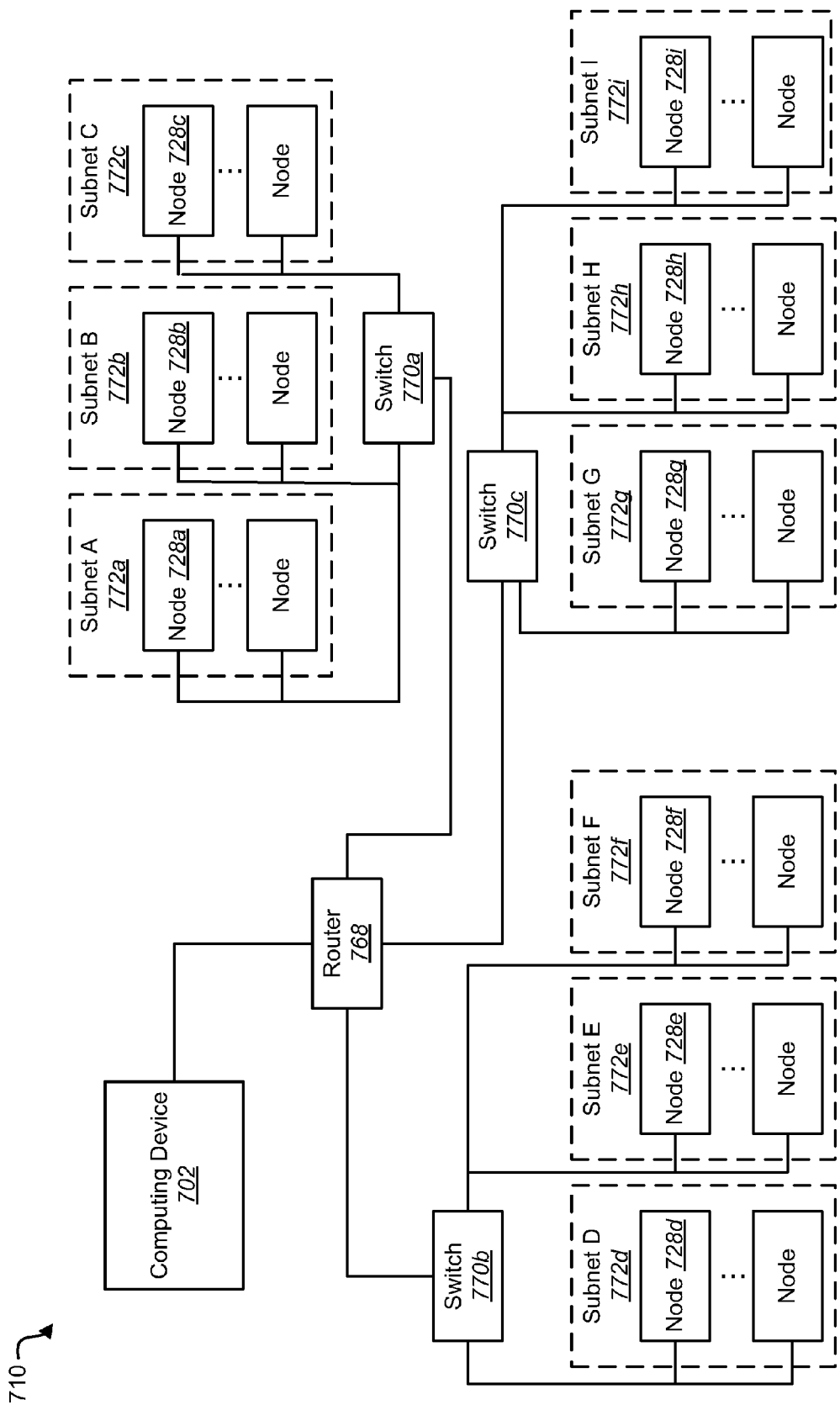
FIG. 7 is a block diagram illustrating a configuration of a network where systems and methods for actively provisioning a managed node may be implemented.

FIG. 7 is a block diagram illustrating a configuration of a network 710 where systems and methods for actively provisioning a managed node by a computing device 702 may be implemented. A computing device (e.g., administrative system) 702 may be connected to a router 768. The router 768 may be connected to switches 770a, 770b, 770c. The switch 770a may be connected to several nodes 728a, 728b, 728c, etc., via their respective subnets 772a, 772b, 772c. The switch 770b may be connected to several nodes 728d, 728e, 728f, etc., via their respective subnets 772d, 772e, 772f. The switch 770c is connected to several nodes 728g, 728h, 728i, etc., via their respective subnets 772g, 772h, 772i. Although FIG. 7 only shows one router 768, and a limited number of switches 770, subnets 772, and nodes 728, many and varied numbers of routers 768, switches 770, subnets 772 and nodes 728 may be included in networks and/or systems where methods and systems for enforcing and complying with a computing device power policy may be implemented. It should be noted that the computing device 702 illustrated in FIG. 7 may be configured similarly to the computing device 102, 502 described above. It should also be noted that the nodes 728 illustrated in FIG. 7 may be configured similarly to the managed nodes 112, 612 described above.

Figure 8:
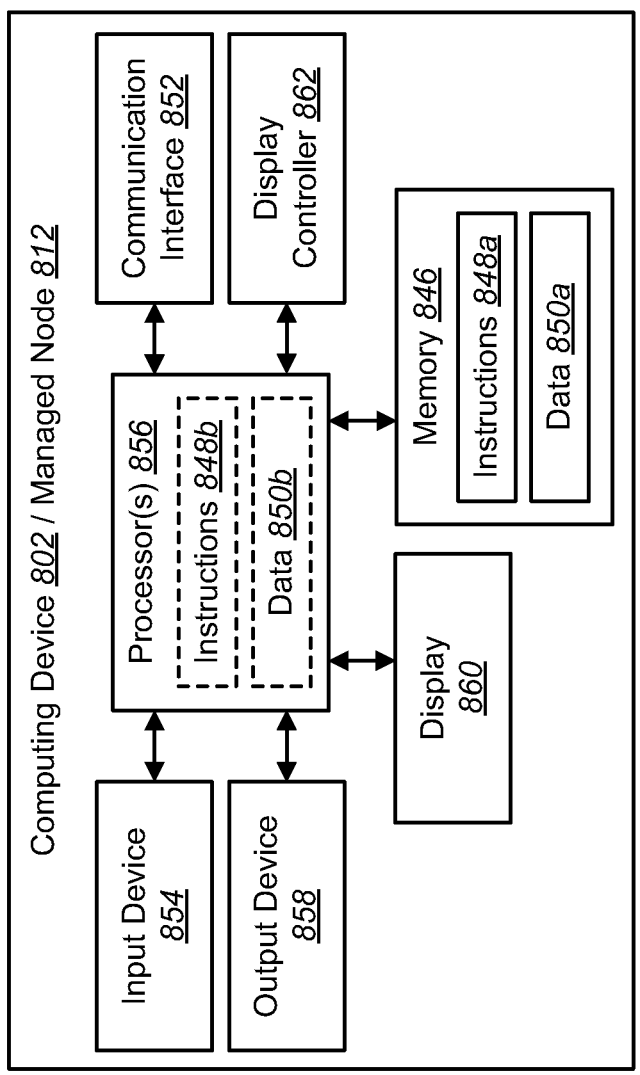
FIG. 8 illustrates various components that may be utilized in a computing device (e.g., administrative system) and/or managed node.

FIG. 8 illustrates various components that may be utilized in a computing device 802 (e.g., administrative system) and/or managed node 812. The illustrated components may be located within the same physical structure or in separate housings or structures.

The computing device 802 or managed node 812 may include one or more processor(s) 856 and memory 846. The memory 846 may include instructions 848a and data 850a. The processor 856 controls the operation of the computing device 802 or managed node 812 and may be, for example, a microprocessor, a microcontroller, a digital signal processor (DSP) or other device known in the art. The processor 856 may be in electronic communication with the memory 846. The processor 856 typically performs logical and arithmetic operations based on program instructions 848b and/or data 850b it loads from the memory 846.

The computing device 802 or managed node 812 typically may include one or more communication interfaces 852 for communicating with other electronic devices. The communication interfaces 852 may be based on wired communication technology, wireless communication technology or both. Examples of different types of communication interfaces 852 include a serial port, a parallel port, a Universal Serial Bus (USB) port, an Ethernet adapter, an IEEE 1394 bus interface, a small computer system interface (SCSI) bus interface, an infrared (IR) communication port, a Bluetooth wireless communication adapter, a network storage device, an external hard drive, an optical drive (e.g., Compact Disc (CD) drive, Digital Video Disc (DVD) drive, Blu-ray drive, etc.) and so forth.

The computing device 802 or managed node 812 typically may include one or more input devices 854. Examples of different kinds of input devices 854 include a keyboard, mouse, microphone, remote control device, button, joystick, trackball, touchpad, lightpen, camera and/or other input device 854. The input device 854 may be used to receive input from another device and/or from a user of the computing device 802 or managed node 812. The input device 854 may comprise multiple devices, blocks and/or modules that the computing device 802 may use to receive information. For instance, an input device 854 may be an Ethernet card that can receive information from another computing device connected to a network. In another example, the input device 854 may be a computer mouse that may be used by the computing device 102 to detect user interaction such as a "click" on an icon and/or translation of a cursor.

The computing device 802 or managed node 812 typically may include one or more output devices 858. Examples of different kinds of output devices 858 include displays, projectors, speakers, tactile devices, network cards, wireless transmitters, infrared transmitters, lights, etc. The output device 858 may be used to output, transmit, send, display, project, emit and/or convey information to another device and/or to a user of the computing device 102 or managed node 812. For instance, the output device 858 may be a monitor that can display information (e.g., images) to a user. In another example, the output device 858 may be a network card that can transmit information to another computing device connected to a network. In some configurations, the output device 858 may display a graphical user interface (GUI) to facilitate user interaction. For example, the computing device 802 may display a window with icons that a user may interact with using a keyboard and/or mouse (e.g., "keyboard/mouse").

One specific type of output device that may typically be included in a computer system is a display device 860. Display devices 860 used with configurations disclosed herein may utilize any suitable image projection technology, such as a cathode ray tube (CRT), liquid crystal display (LCD), light-emitting diode (LED), gas plasma, electroluminescence or the like. A display controller 862 may also be provided for converting data 850a stored in the memory 846 into text, graphics and/or moving images (as appropriate) shown on the display device 860.

Of course, FIG. 8 illustrates only one possible configuration of a computing device 802 or managed node 812. Various other architectures and components may be utilized.

In the above description, reference numbers have sometimes been used in connection with various terms. Where a term is used in connection with a reference number, this may refer to a specific element that is shown in one or more of the figures. Where a term is used without a reference number, this may refer generally to the term without limitation to any particular figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be non-transitory and tangible.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device configured for actively provisioning a managed node, comprising:
a processor;
memory in electronic communication with the processor;
instructions stored in the memory, the instructions being executable to:
identify a managed node on a network;
determine whether the managed node comprises management hardware, wherein the management hardware comprises a processor, chipset and network adaptor that are separate from hardware utilized by an operating system of the managed node, wherein the management hardware utilizes a first network stack, wherein the hardware utilized by an operating system of the managed node utilizes a physical port to connect with the network and the management hardware utilizes the physical port to connect with the network, wherein the operating system of the managed node utilizes a second network stack that is separate from the first network stack;
enable the management hardware, wherein enabling comprises:
opening hardware-based secure communication between the computing device and the node;
allowing access to a management engine; and
provisioning the management engine, wherein provisioning the management engine comprises changing settings for the managed node; and
add the managed node to a database.

2. The computing device of claim 1, wherein identifying the managed node further comprises detecting a new node being added to the network.

3. The computing device of claim 1, wherein provisioning the management engine further comprises changing the management hardware to a specific state.

4. The computing device of claim 1, wherein the instructions are further executable to configure the managed node.

5. The computing device of claim 1, wherein the computing device is connected to the managed node by an out-of-band connection.

6. The computing device of claim 1, wherein the management hardware further comprises Intel® vPro Technology.

7. The computing device of claim 1, wherein the instructions are further executable to negotiate an authorized certificate.

8. The computing device of claim 1, wherein no agent is needed on the managed node.

9. A method for actively provisioning a managed node, comprising:
identifying a managed node on a network;
determining whether the managed node comprises management hardware, wherein the management hardware comprises a processor, chipset and network adaptor that are separate from hardware utilized by an operating system of the managed node, wherein the management hardware utilizes a first network stack, wherein the hardware utilized by an operating system of the managed node utilizes a physical port to connect with the network and the management hardware utilizes the physical port to connect with the network, wherein the operating system of the managed node utilizes a second network stack that is separate from the first network stack;
enabling the management hardware, wherein enabling comprises:
opening hardware-based secure communication between a computing device and the node;
allowing access to a management engine; and
provisioning the management engine, wherein provisioning the management engine comprises changing settings for the managed node; and
adding the managed node to a database.

10. The method of claim 9, wherein identifying the managed node further comprises detecting a new node being added to the network.

11. The method of claim 9, wherein provisioning the management engine further comprises changing the management hardware to a specific state.

12. The method of claim 9, further comprising configuring the managed node.

13. The method of claim 9, wherein the computing device is connected to the managed node by an out-of-band connection.

14. The method of claim 9, wherein the management hardware further comprises Intel® vPro Technology.

15. The method of claim 9, further comprising negotiating an authorized certificate.

16. The method of claim 9, wherein no agent is needed on the managed node.

17. A non-transitory tangible computer-readable medium for actively provisioning a managed node comprising executable instructions for:
identifying a managed node on a network;
determining whether the managed node comprises management hardware, wherein the management hardware comprises a processor, chipset and network adaptor that are separate from hardware utilized by an operating system of the managed node, wherein the management hardware utilizes a first network stack, wherein the hardware utilized by an operating system of the managed node utilizes a physical port to connect with the network and the management hardware utilizes the physical port to connect with the network, wherein the operating system of the managed node utilizes a second network stack that is separate from the first network stack;
enabling the management hardware, wherein enabling comprises:
opening hardware-based secure communication between a computing device and the node;
allowing access to a management engine; and
provisioning the management engine, wherein provisioning the management engine comprises changing settings for the managed node; and
adding the managed node to a database.

18. The computer-readable medium of claim 17, wherein provisioning the management engine further comprises changing the management hardware to a specific state.

* * * * *